US011447381B2

(12) United States Patent
Smith

(10) Patent No.: US 11,447,381 B2
(45) Date of Patent: Sep. 20, 2022

(54) BOTTLE OPENER SLEEVE

(71) Applicant: Kori R. Smith, Bedford, PA (US)

(72) Inventor: Kori R. Smith, Bedford, PA (US)

(*) Notice: Subject to any disclaimer, the term of this patent is extended or adjusted under 35 U.S.C. 154(b) by 0 days.

(21) Appl. No.: 17/678,724

(22) Filed: Feb. 23, 2022

(65) Prior Publication Data
US 2022/0267133 A1 Aug. 25, 2022

Related U.S. Application Data

(60) Provisional application No. 63/153,901, filed on Feb. 25, 2021.

(51) Int. Cl.
*B67B 7/16* (2006.01)
*A01K 87/00* (2006.01)
*A63B 60/14* (2015.01)

(52) U.S. Cl.
CPC .............. *B67B 7/16* (2013.01); *A01K 87/007* (2013.01); *A63B 60/14* (2015.10)

(58) Field of Classification Search
CPC .......... B67B 7/16; A01K 87/007; A63B 60/14
See application file for complete search history.

(56) References Cited

U.S. PATENT DOCUMENTS

| 4,560,344 | A | * | 12/1985 | Kietaibl | F23Q 2/32 |
| | | | | | 7/151 |
| 6,869,373 | B1 | | 3/2005 | Byrne et al. | |
| 6,973,750 | B1 | | 12/2005 | Kim | |
| 7,412,794 | B2 | | 8/2008 | Smith | |
| 7,685,908 | B1 | * | 3/2010 | Sebastian | B67B 7/16 |
| | | | | | 81/3.15 |
| 8,282,514 | B2 | * | 10/2012 | Kapheim | A63B 49/12 |
| | | | | | 473/549 |
| 9,149,139 | B1 | | 10/2015 | Rogers et al. | |
| 9,695,026 | B2 | * | 7/2017 | Simmons | B67B 7/16 |
| 10,307,006 | B2 | | 6/2019 | Knoll | |
| 10,988,304 | B1 | * | 4/2021 | Arjonilla | B65D 81/18 |
| 11,040,819 | B1 | * | 6/2021 | Frankcomb | A47G 23/0216 |
| 2008/0060479 | A1 | * | 3/2008 | Nelson | B67B 7/16 |
| | | | | | 220/737 |

(Continued)

OTHER PUBLICATIONS

"CRB Weighted Butt Cap," Mudhole.com. https://mudhole.com/products/crb-weighted-butt-cap?gclid=CjwKCAjw_NX7BRA1EiwA2dpg0iovTJRYIG7SEmjrT4uBrP53TCb_OG6FOf12EQXI0Hgj7o7NJTE0zxoCzCYQAvD_BwE [Dated accessed: Oct. 14, 2020].

*Primary Examiner* — David B. Thomas
(74) *Attorney, Agent, or Firm* — Binita J. Singh; Bold IP, PLLC

(57) ABSTRACT

The present invention is a bottle opener device that can be connected to an end of a handle such as a sporting equipment handle. The bottle opener device includes a sleeve having a hollow tubular shape with an open end and a closed end. The sleeve has a length and a width configured to enclose around the end of the handle. A bottle opener element is connected to the closed end of the sleeve with an opener cutout for enabling the removal of a bottle cap from a bottle. The bottle opener device also includes a magnetic element that holds on to the bottle cap against the bottle opener element after removal. A closing mechanism is integrated along a length of the sleeve which opens and closes and allows the bottle opener sleeve to be placed around the handle and tightly secure it in place by closing.

21 Claims, 8 Drawing Sheets

(56) References Cited

U.S. PATENT DOCUMENTS

| | | | |
|---|---|---|---|
| 2008/0237242 A1* | 10/2008 | Gifford | A47G 23/0216 |
| | | | 220/592.16 |
| 2013/0203517 A1 | 8/2013 | Bolane et al. | |
| 2013/0334237 A1* | 12/2013 | Priest | B65D 81/3876 |
| | | | 220/739 |
| 2014/0290439 A1 | 10/2014 | Christian et al. | |
| 2016/0166902 A1 | 6/2016 | Day et al. | |
| 2017/0174491 A1 | 6/2017 | Fontaine | |
| 2017/0225931 A1* | 8/2017 | Farar | B67B 7/16 |
| 2019/0082872 A1* | 3/2019 | Wortham | A47G 23/0216 |
| 2020/0229413 A1 | 7/2020 | Snopkowski | |

\* cited by examiner

BOTTLE OPENER SLEEVE

CROSS REFERENCE TO RELATED APPLICATION

This application claims benefit of U.S. Provisional Application No. 63/153,901 filed on Feb. 25, 2021, which is incorporated herein by reference in its entirety.

FIELD OF THE DISCLOSURE

The present invention relates to accessories for sports equipment, and in particular to a bottle opener integrated for use with sports equipment.

BACKGROUND

It is common for friends to share something cold after engaging in a sport activity. Post activity time is about enjoyment and bonding with friends. It also has a celebratory factor. Some activities may be enjoyed while consuming a cold beverage, such as fishing. Thus, people will consume and connect over beverages before, during, and/or after an activity. When it comes to beverages, the preference is evenly split between canned and bottled. However, in most cases a bottled beverage is provided with a standard bottle cap which requires a standard bottle opener. It can be the case that often people may forget to pack a bottle opener, misplace, or drop the bottle opener, or it may be inconvenient to carry a bottle opener. In such a case, one may find themself in a position of struggling to open the beverage bottle or not being able to consume the beverage at all. Thus, there is still a need for a desirable means to open a bottled beverage that is convenient and easily accessible The invention described herein addresses the shortcoming and provides for an improved means of opening a beverage container which may be used by participants in a sporting activity or a recreational activity before, during, and/or after activity.

SUMMARY

According to one embodiment, one or more embodiments are provided below for a bottle opener sleeve. The bottle opener sleeve is meant to be connected to a sporting equipment handle, and in particular on an end of a sporting equipment handle. The bottle opener sleeve is meant to provide the convenience of having a bottle opener on hand during a sporting or recreational activity but does not take away from the functionality of the sporting equipment to which the bottle opener sleeve is connected to. The bottle opener sleeve is also configured to prevent a bottle cap from falling to the ground after a bottle cap is removed from a bottle. This utility prevents littering which causes pollution and also can be stepped on causing injury if a person stepping on the bottle cap is barefoot.

According to one non-limiting embodiment, the bottle opener sleeve comprises of a sleeve, having a hollow tubular shape. The sleeve has a length, a width, an open end, and an opposing closed end so the sleeve can be slipped around an end of a handle with the closed end abutting against a flat end of the handle. The closed end of the sleeve is connected to a bottle opener element which functions to remove a bottle cap from a beverage bottle. The bottle opener element has an offset hole from the center axis which connects to a small projection, a nipple, on the closed end of the sleeve. The nipple is also offset from the center axis of the closed end and corresponds with the hole on the bottle opener element. The nipple threads through the opening to connect the bottle opener element to the closed end. At the same time, the connection allows the bottle opener to pivot away from the closed end during use which allows a bottle cap to be inserted into an opener cutout in the bottle opener sleeve. The opener cutout is designed to open the bottle cap and is shaped like other bottle openers known in the arts or will be known in the future. The bottle opener sleeve also has a magnetic element which holds the bottle cap to the bottle opener element once removed from the beverage ensuring that the bottle cap does not fall to the ground and is easily retrievable to discard appropriately. The magnetic element is fitted into the nipple. The magnetic element within the nipple is fitted into a portion of the nipple that is threaded through the bottle opener element and thus faces away from the closed end of the sleeve.

In other non-limiting embodiments, a bottle opener sleeve is described with all the above features and further includes a closing mechanism which is integrated into the sleeve. The closing mechanism is integrated into the length of the sleeve from the closed end to the open end. Specifically, a portion of the sleeve is cut out along the length such that the closing mechanism may be integrated to the sleeve. The closing mechanism opens and closes to make it easier to place the bottle opener sleeve on an end of a handle and close the closing mechanism to securely fit the bottle opener sleeve around the handle.

In another non-limiting embodiment, a bottle opener sleeve is described wherein a sleeve has a textured interior surface allowing a gripping surface to the interior such that the sleeve grips a handle it is fitted around.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
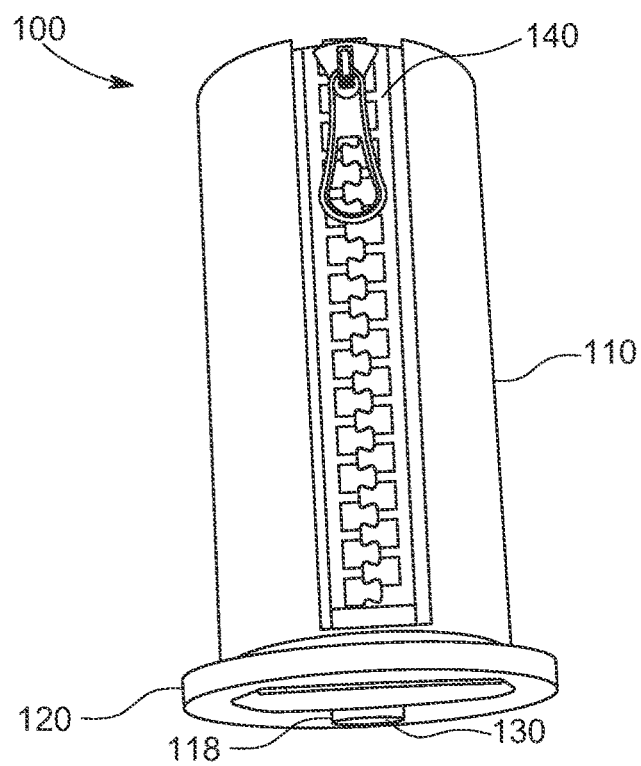
FIG. 1 is a perspective view of an example of a bottle opener sleeve.

In the Summary above and in this Detailed Description, and the claims below, and in the accompanying drawings, reference may be made to particular features of the invention. It may be understood that the disclosure of the invention in this specification includes all possible combinations of such particular features. For example, where a particular feature may be disclosed in the context of a particular aspect or embodiment of the invention, or a particular claim, that feature can also be used, to the extent possible, in combination with and/or in the context of other particular aspects and embodiments of the invention, and in the invention generally.

Where reference may be made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" may be used herein to mean "serving as an example, instance, or illustration." Any aspect described in this document as "exemplary" may not be necessarily construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The present disclosure provides for an improved means of opening a beverage container which may be integrated on a sporting equipment and be readily accessible for use by participants in a sporting activity before, during, and/or after activity. Preferably, the piece of equipment may be a fishing rod. Other sporting equipment may include a field hockey stick, an ice hockey stick, a golf stick, and other piece of sports equipment which includes a handle.

One or more embodiments describe a bottle opener sleeve, comprising of a sleeve, a bottle opener element, and a magnetic element, wherein the sleeve is integrated with the magnetic element, and the bottle opener. The sleeve is comprised of a hollow cylinder which is designed to be slipped over an end of a handle of a piece of sporting equipment. The sleeve has an open end and a closed end. The open end allows the sleeve to be slipped over the end of the handle. The closed end of the sleeve is integrated with a bottle opener. The bottle opener sleeve is also incorporated with a magnetic element allowing the magnetic element to retain the bottle cap on the bottle opener sleeve after it has been removed from a beverage bottle. The advantage of magnetically retaining the bottle cap to the bottle opener makes it easier to dispose of the cap in the right place. Additionally, the magnetic element also prevents the bottle cap from falling and littering, and possibly losing the cap. An alternative embodiment of the present disclosure also provides for a sleeve which comprises of a closing mechanism integrated along a side of the sleeve, making it easier to slip the sleeve over the handle, enclosing the sleeve around the handle, and maintaining a tight fit. In yet another embodiment, an inner surface of the sleeve comprises of ridges to provide for a surface that makes a strong gripping contact with a handle the sleeve is slipped onto.

Figure 2:
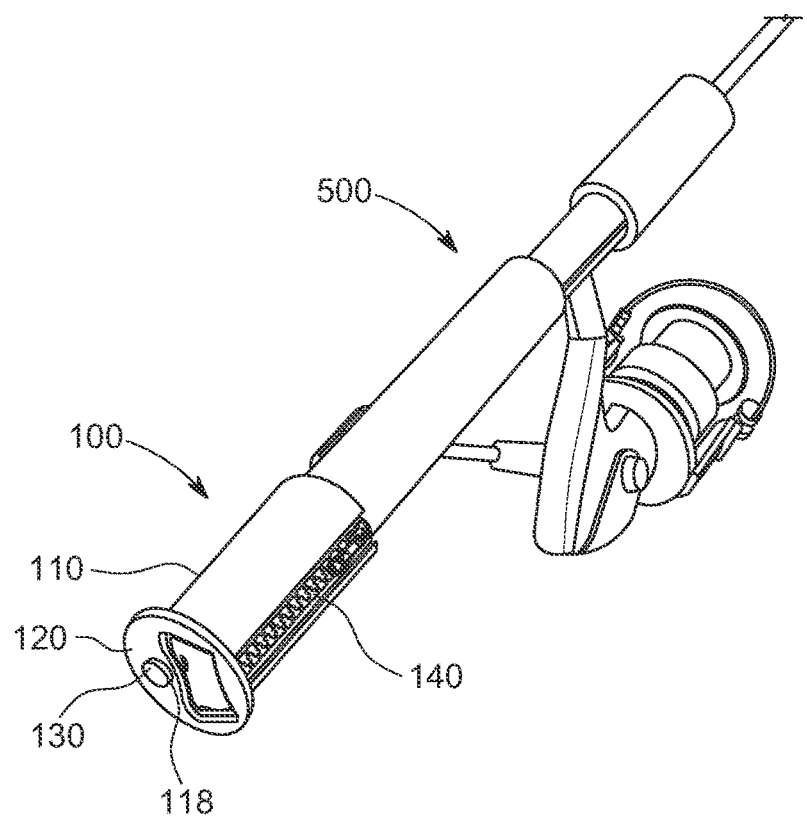
FIG. 2 is an environmental view of a bottle opener sleeve placed over an end of a fishing rod handle.
Figure 3:
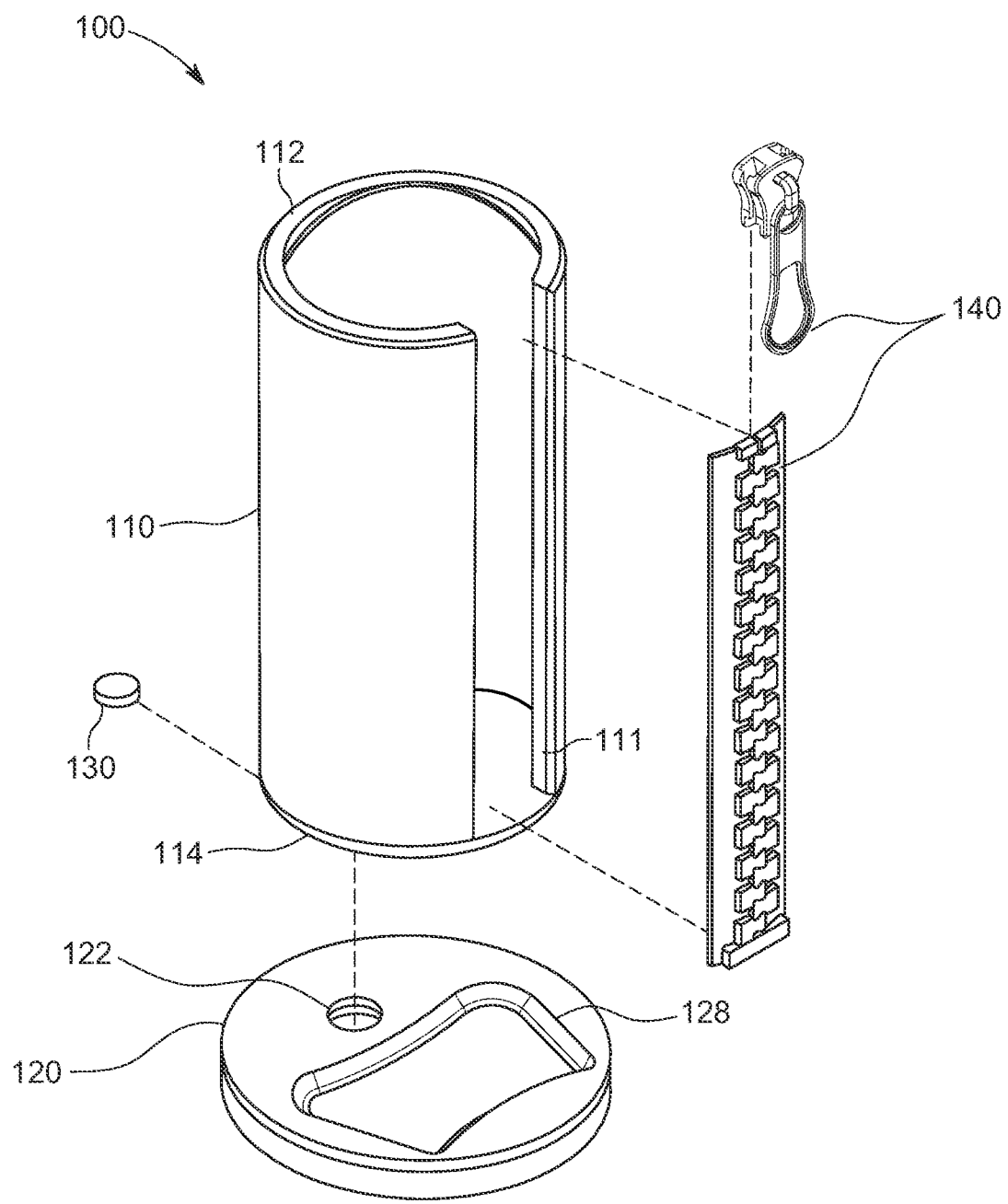
FIG. 3 is an exploded view of a bottle opener sleeve.

Referring to the figures, one or more non-limiting embodiments of the present invention are illustrated by way of an example. The illustration and description aid in the understanding of the present invention and are not intended to limit the invention. FIG. 1-3 illustrates a non-limiting embodiment of the present invention of a bottle opener sleeve 100 for use with a solid handle. FIG. 1 is perspective view of a non-limiting embodiment of the bottle opener sleeve 100. FIG. 2 is an environmental view of the bottle opener sleeve 100 connected to an end of a fishing rod 500. FIG. 3 is an exploded view of the bottle opener sleeve 100 illustrating the components comprising the bottle opener sleeve 100. As best seen in FIGS. 1 and 2, the bottle opener sleeve 100 may be comprised of a sleeve 110, a bottle opener element 120, a magnetic element 130, and a closing mechanism 140. The bottle opener element 120 is adapted to be connected to the sleeve 110. The magnetic element 130 is connected to the sleeve 110 and the bottle opener element 120 and is positioned on the sleeve 100 and the bottle opener element to hold a bottle cap once it is removed from a beverage bottle.

The sleeve 110 is configured to be connected to a handle on a sporting equipment, such as a fishing rod, a hockey stick, etc. In one or more non-limiting embodiments, the sleeve 110 may have a hollow tubular shape with two opposing ends, an open end 112 and a closed end 114, as best seen in FIG. 2. It is to be understood that the term "tubular" includes a tubular shape having any cross-section, including, and not limited to, circular, square, rectangular, and oblong cross-section. In the case of the one or more embodiments shown in FIG. 1-3, the bottle opener sleeve 100 may be designed to slip over an end of a fishing rod 500, thus the sleeve 110 is configured with a hollow tubular shape having a circular cross-section. As can be seen in FIG. 2, the bottle opener sleeve 100 is fitted over and encloses an end of the fishing rod 500, wherein the fishing rod 500 has a circular handle and the bottle opener sleeve 100 with the sleeve 110 having a circular cross-section is able to slip over and fit snugly around the end of the fishing rod 500.

The sleeve 110 has a length and a width that allows the bottle opener sleeve 100 to fit over a length and a width, respectively, of a sporting equipment handle. The length of the sleeve 110 is generally configured to provide enough leverage to the bottle opener sleeve 100 when removing a bottle cap from a beverage bottle. Additionally, the length of the sleeve 110 ideally must be unobtrusive to the use of the sporting equipment. For example, the bottle opener sleeve 100 does not hinder or otherwise impede a user's grip on a sporting equipment handle. The sleeve 110 may have a length in the range of 1 inch to 3 inches. For example, the sleeve 110 of the bottle opener sleeve 100 shown in the figures may have a length of 2.4 inches allowing the bottle opener sleeve 100 to conform to the handle of the fishing rod 500 and provide leverage for use. The width of the sleeve 110 may vary and is generally sized to permit a snug fit around a variety of sport equipment with handles. Using the example from above of the fishing rod, the width of the sleeve 110 is configured in various sizes that are selected to snugly fit around some of the more common width sizes of standard fishing rod handles.

Various shapes and sizes of the sleeve 110 are configurable to accommodate the more common sizes of sporting equipment handles that can benefit from the bottle opener sleeve 100. Preferably, the sleeve 110 may be fashioned of a rubber material such as synthetic rubber. Other materials that are sufficiently elastic and durable may also be used.

As described above, the sleeve 110 has two opposing ends, the open end 112 and the closed end 114. The open end 112 is configured to slip over an end of a handle (e.g., an end of a fishing rod 500 shown in FIG. 2). The closed end 114 is configured to be connected to the bottle opener element 120. The closed end 114 may be relatively thicker than a remainder of the sleeve 110 to protect the end of the sporting equipment handle from the bottle opener element 120 use. The relative thickness of the closed end 114, to which the bottle opener element 120 abuts against, protects the handle onto which the bottle opener sleeve 100 is overlaid from the bottle opener element 120 and a bottle cap. As a bottle cap is being removed from a beverage bottle using the bottle opener sleeve 100, the bottle cap may push against the closed end 114 and thus having the relatively thicker material protects the sporting equipment handle end. Alternatively, the closed end 114 of the sleeve 110 may be fashioned from material that is sturdier and harder than the remainder of the sleeve 110 so as to offer protection to a sporting equipment handle the bottle opener sleeve 100 is attached to.

It is to be understood, that the bottle opener element 120 may also be connected to the closed end 114 of the sleeve 110 by alternative means. For example, the bottle opener element 120 may be recessed into the closed end 114 and abut against the material used to close the closed end 114. The bottle opener 120 may also vary in size and shape and is designed to fit within the inner dimensions of the closed end 106 of the sleeve 110. Thus, various shapes and sizes are possible to accommodate the variety of sporting equipment with a handle.

Figure 4A:
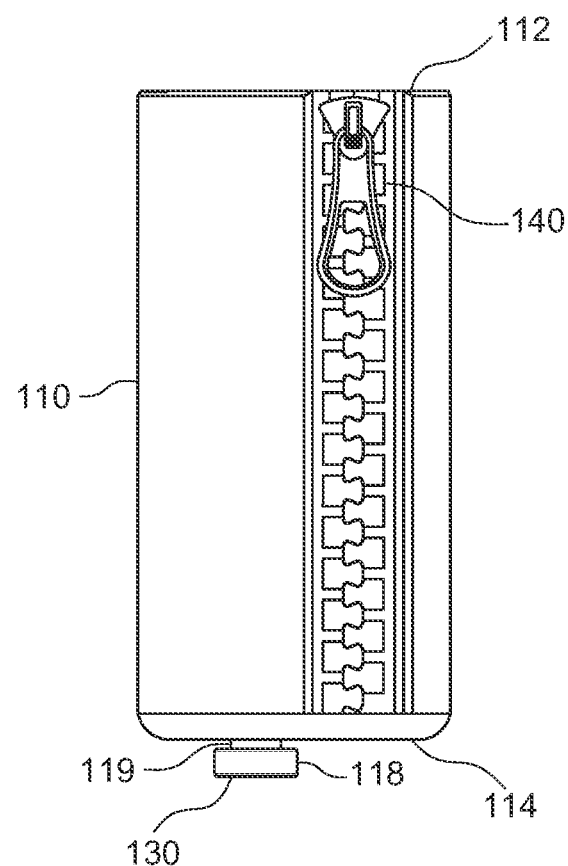
FIG. 4A is a side perspective view of the bottle opener sleeve without the bottle opener element.

As mentioned above, the bottle opener element 120 is connected to the outer surface of the closed end 114. To attach the bottle opener element 120, the closed end 114 on the outer surface of the sleeve 110 is configured with a small projection, referred to as a nipple 118, as best seen in FIG. 4A. The nipple 118 may be integrated to the closed end 114 from a single piece and fashioned from the same material used to fashion the remainder of the sleeve 110. The nipple 118 allows the bottle opener element 120 to be connected to the sleeve 110. Thus, the bottle opener element 120 is connected to the sleeve 110 without the use of fixtures. The nipple 118 is offset from a center axis of the closed end 114 of the sleeve 110. The offset nipple 118 is needed to make room for the bottle opener element 120 to function properly.

Figure 4B:
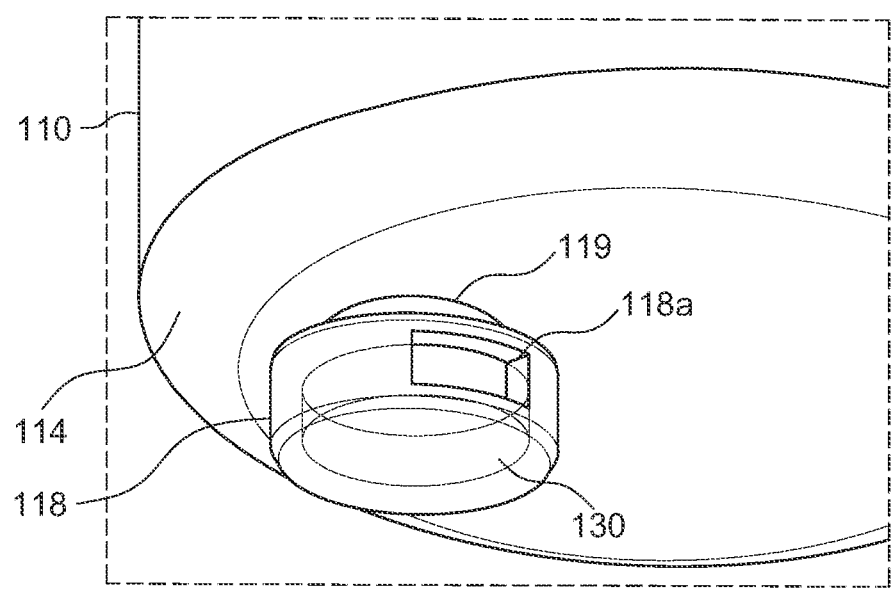
FIG. 4B is a bottom closeup view of the bottle opener sleeve from FIG. 4A.
Figure 5A:
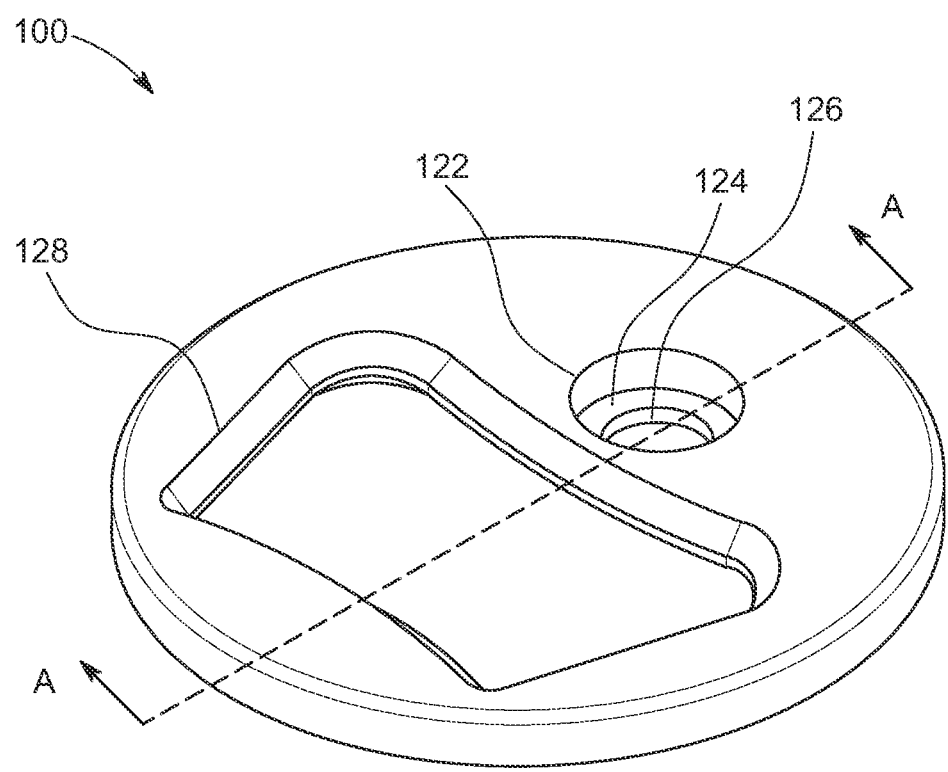
FIG. 5A is side perspective view of a bottle opener element.
Figure 5B:
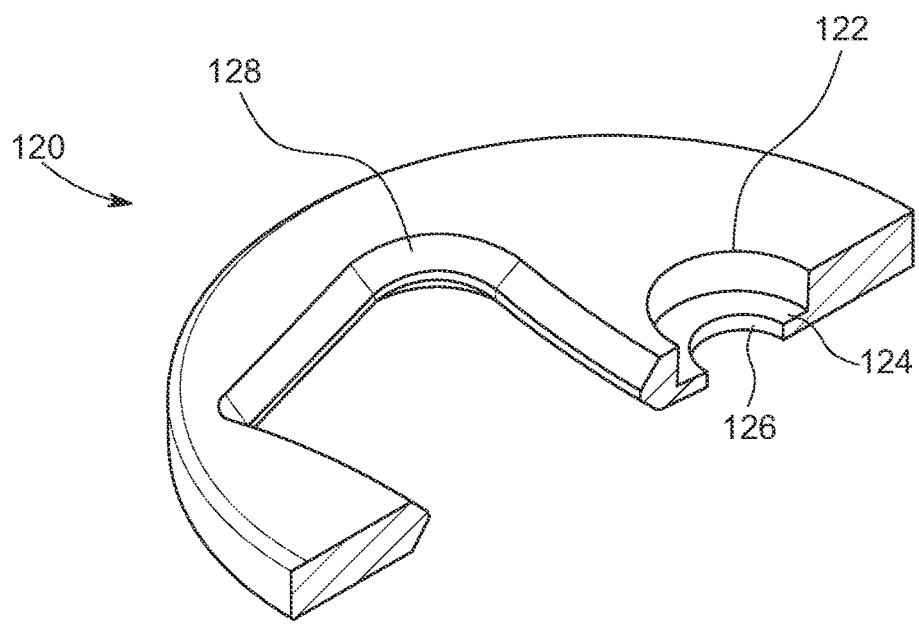
FIG. 5B is a cross sectional view of the bottle opener element of FIG. 5A along a line A-A.
Figure 5C:
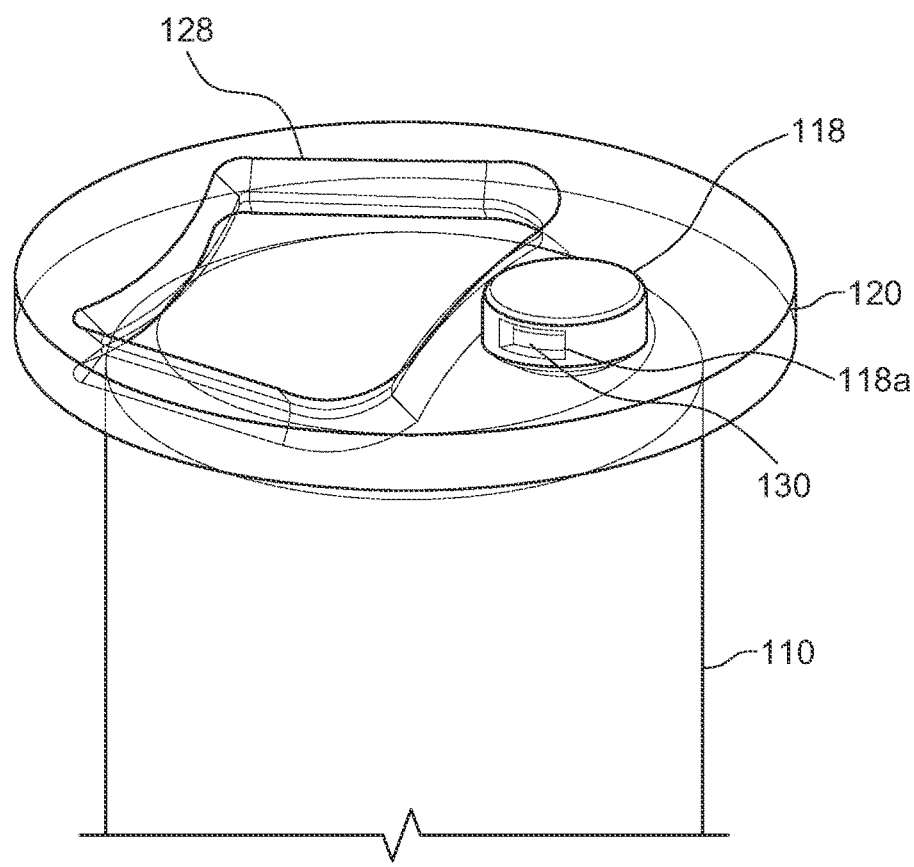
FIG. 5C is bottom closeup view of the bottle opener element on the bottle opener sleeve.

The nipple 118 is configured to encapsulate the magnetic element 130. As seen in FIGS. 4B and 5C, the nipple has an opening 118a allowing the magnetic element to be inserted into the nipple 118. The opening 118a is in a portion of the nipple 118 that extends out from the bottle opener element (described below). The opening 118a in the nipple allows insertion and removal of the magnetic element 130 if desired. The magnetic element 130 may include any high strength magnet. Essentially, the magnetic element 130 may create a magnetic field to hold a bottle cap from a beverage bottle after the bottle cap has been removed from the beverage bottle using the bottle opener sleeve 100. The bottle opener sleeve 100 allows a user to easily retrieve the bottle cap magnetically connected to the bottle opener sleeve 100 instead of searching on the ground for the bottle cap. It is to be understood that in an alternate embodiment, the bottle opener element 120 may be fashioned from a permanent magnet which not only functions as a bottle opener, but also ensures that a removed bottle cap stays connected to the bottler opener element 120 after it is removed from a beverage bottle.

Referring to FIG. 4B, the magnetic element 130 fits snugly within the nipple 118 and having a shape that conforms with a shape of the nipple 118. FIG. 3 illustrates the exploded view of the bottle opener sleeve 100 and shows that the magnetic element 130 may have a disc shape. An example of a type of magnet that may be used incudes neodymium. As best seen in FIG. 4A, the magnetic element 130 within the nipple 118 is positioned slightly away from the closed end 114 of the sleeve 110 forming a recessed portion 119 between the magnetic element 130 and the closed end 114 of the sleeve. This recessed portion 119 is configured all around the nipple 118 in a circular pattern between the magnetic element 130 and the closed end 114. As discussed below, the bottle opener element 120 is connected to the sleeve 110 by the nipple 118.

Referring to FIGS. 3 and 5A-5C, the bottle opener element 120 may be a flat, thin, round object, such as a disk. The bottle opener element 120 has a hole 122 for the nipple 118 to thread into. An inside edge of the hole 122 closer to the closed end 114 sleeve 110 is configured with a smaller opening 126 such that a trim 124 is formed around the smaller opening 126. The smaller opening 126 is configured for the recessed portion 119 on the nipple 118 to fit through with the magnetic element 130 in the nipple 118 resting within the hole 122 on top of the trim 124. The trim 124 and the smaller opening prevent the magnetic element 130 and the nipple from slipping out of the hole 120. Essentially, the smaller opening 126 encircles the recessed portion 119 on the nipple and the magnetic element 130 within the nipple 118 keeps the bottle opener element 120 in place abutting against the closed end 114 of the sleeve 110. Essentially, the magnetic element 130 within the nipple 118 prevents the bottle opener element 120 from coming off the nipple 118 during use. The hole 122 on the bottle opener element 120 is offset from a center axis of the bottle opener element 120 and corresponds with the offset of the nipple 118 on the sleeve 110. The bottle opener element 120 is also configured with an opener cutout 128 configured to fit a bottle cap to enable a bottle cap opening mechanism. The opener cutout 128 for the bottle opener element 120 may be based off similar designs from existing bottle openers or any that may exist in the future.

The bottle opener element 120 has a diameter which may be longer than a diameter of the closed end 114 of the sleeve 110. FIG. 5C illustrates the bottle opener element 120 connected to the sleeve 110 and the diameter of the bottle opener element 120 extends past the edges of the closed end 114 on the sleeve 110. The longer diameter on the bottle opener element 120 provides additional leverage when using the bottle opener sleeve 100 to remove a bottle cap from a beverage bottle. It is to be understood that the diameters for the bottle opener element 120 and the closed end 114 may be similar where the edges of the bottle opener element 120 are flush with the edges of the closed end 114. The bottle opener 120 may be fashioned from material that is commonly used for bottle openers and may come in a variety of styles.

As shown in FIGS. 1-4A, the bottle opener sleeve 100 may also comprise of the closing mechanism 140 that allows the bottle opener sleeve 100 to securely connect onto a handle. The closing mechanism 140 also makes it easier to place bottle opener sleeve 100 around a handle. As shown in the Figures, the mechanism may include a zipper which is integrally connected on the sleeve 110. In this embodiment, the closing mechanism (e.g., zipper) may be integrated on to the sleeve 110 from the open end 112 to the closed end 114. As seen in FIG. 3, a section of the sleeve 110 from the open end 112 to the closed end 114 is cutout to create an opening, referred to as cutout opening 111. The cutout opening 111 creates a "C" like shape to the sleeve 110. The cutout opening 111 has a width that can accommodate and makes space for the closing mechanism 140, wherein the closing mechanism is integrated to the sleeve 110 within the cutout opening 111. The closing mechanism 140 may be opened and closed to subsequently open and closed the bottle opener sleeve 100. In this embodiment, for the bottle opener sleeve 100 to be inserted onto a back of a handle (e.g., a fishing rod handle), the closing mechanism 140 would be in an open position. The open end 112 of the sleeve would be inserted over and around the end of the handle, and then the closing mechanism 114 would be moved to a closed position to secure the bottle opener sleeve 100 around the handle. Alternative closing mechanism 140 may include and not be limited to button snaps, VELCRO, etc.

Figure 6A:
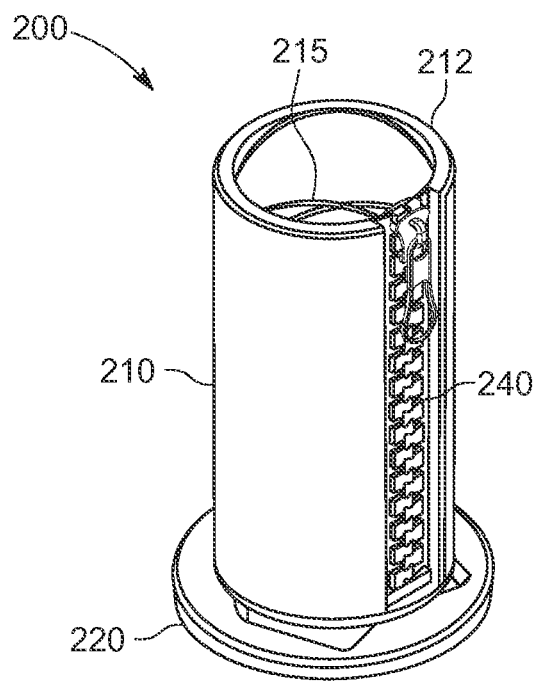
FIG. 6A is a perspective view of an alternate embodiment of a bottle opener sleeve.
Figure 6B:
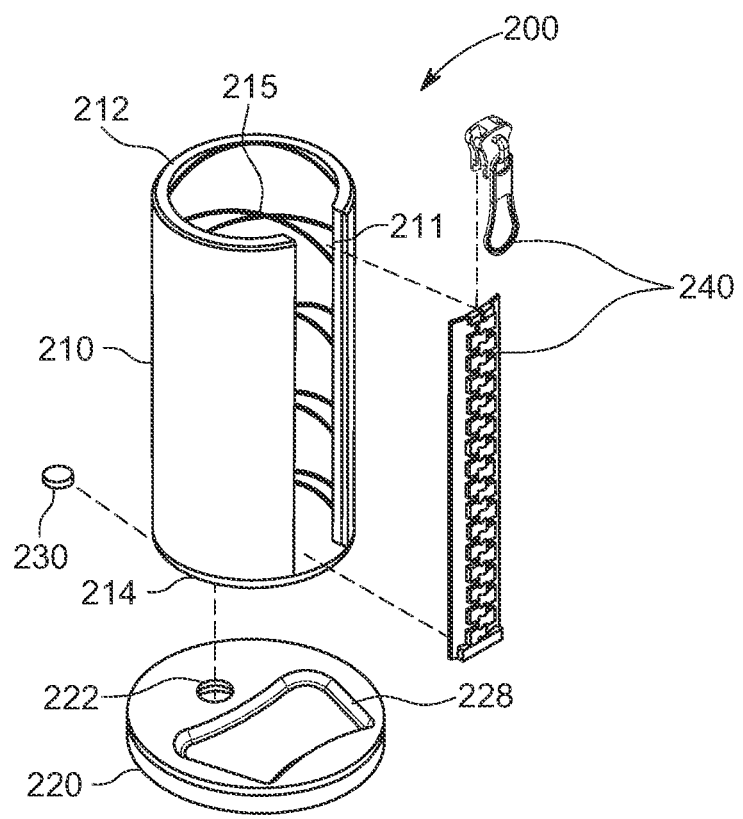
FIG. 6B is an exploded view of the alternate embodiment of the bottle opener sleeve.

FIGS. 6A and 6B illustrate an alternative embodiment of a bottle opener sleeve 200. FIG. 6A is a perspective view of the bottle opener sleeve 200, and FIG. 6B is an exploded view of the bottle opener sleeve 200 illustrating some of the components comprising the bottle opener sleeve 200. The bottle opener sleeve 200 in this alternative embodiment has similar components as the bottle opener sleeve 100 described above. Like the above embodiment, the bottle opener sleeve 200 may comprise of a sleeve 210, a bottle opener element 220, a magnetic element (see, for e.g., magnetic element 130), and a closing mechanism 240. The sleeve 210 has an open end 212, a closed end 214, and a cutout opening 211. The closing mechanism 240 is integrated into the cutout opening 211 of the sleeve 210. The bottle opener element 220 is adapted to be connected to the sleeve 210 like the bottle opener element 120 described in the above embodiment, having a hole 222 and an opener cutout 228.

The bottle opener sleeve 200 has an interior surface of the sleeve 210 which is configured with a textured surface 215 which allows for the sleeve 210 to securely grip onto the handle and prevent the bottle opener from twisting around on the handle or slipping off. The textured surface 215 may include and not be limited to ridges, grooves, or any other pattern on the interior surface of the sleeve 210 that provides a surface with sufficient grip.

FIG. 7A-7D illustrates a method of using the bottle opener sleeve 100 to remove a bottle cap 502 from a beverage bottle 500.

Figure 7A:
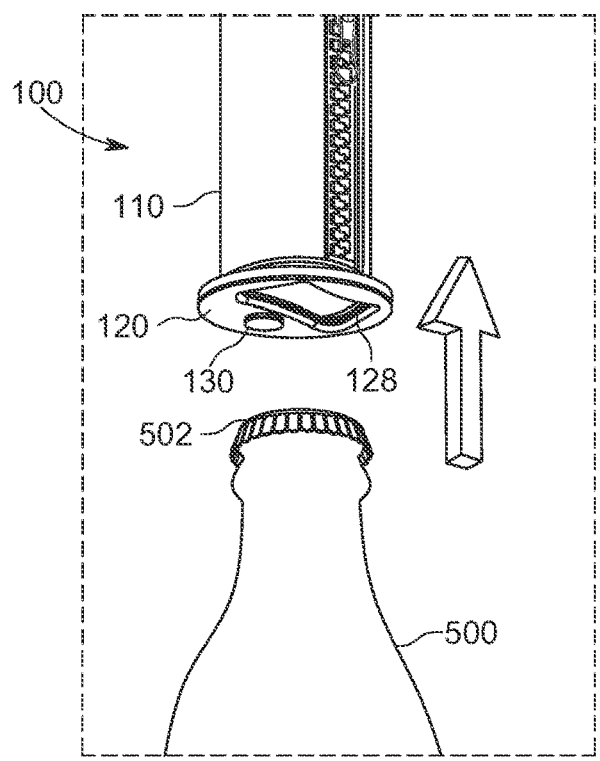
FIG. 7A is an illustration of a step in a method of using the bottle opener sleeve.

FIG. 7A illustrates a first step in using the bottle opener sleeve 100. The beverage bottle 500 is brought to the bottle opener sleeve 100 with the bottle cap 502 aligned with the bottle opener element 120. A user holds the fishing rod with one hand and holds the beverage bottle 500 with the other hand and aligns the bottom of the fishing rod having the bottle opener sleeve 100 to the bottle cap 502 such that their center axes are co-linear.

Figure 7B:
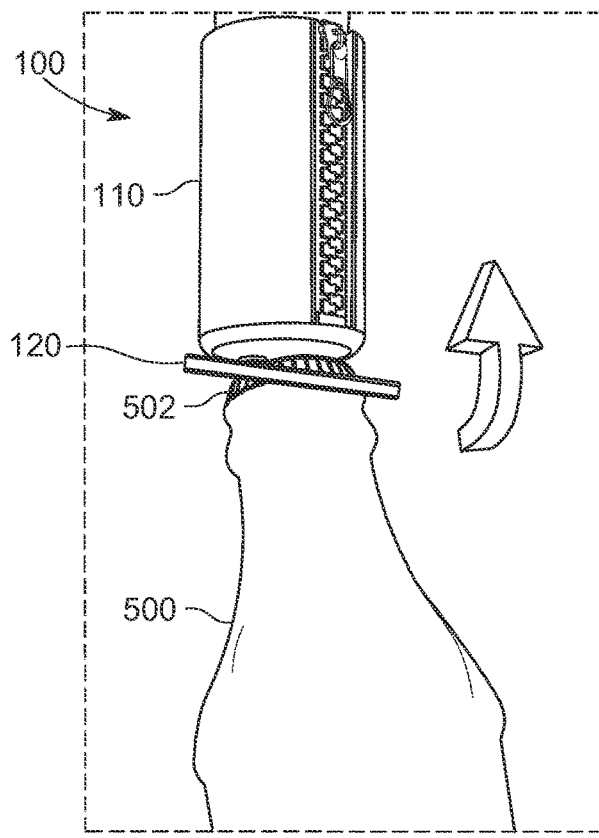
FIG. 7B is an illustration of a next step in a method of using the bottle opener sleeve.

Next, in FIG. 7B, the bottle cap 502 is placed against the bottle opener element 120. Once the bottle cap 502 contacts the bottle opener element 120, an edge of the bottle cap 502 is inserted into the opener cutout 128 (see, FIGS. 2 and 3 for opener cutout 128). Once the bottle cap 502 is inserted into the opener cutout 128, the bottle opener element 120 will pivot away from the closed end 114 at the connection with the nipple 118.

Figure 7C:
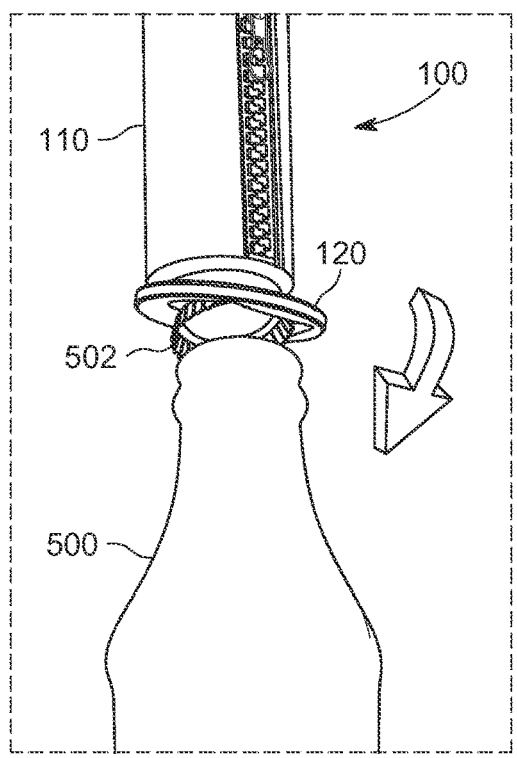
FIG. 7C is an illustration of a next step in a method of using the bottle opener sleeve.

Next, in FIG. 7C, the beverage bottle 500 is pivoted downward at an angle from the bottle opener element 120 until the bottle cap 502 is released from the beverage bottle 500.

Figure 7D:
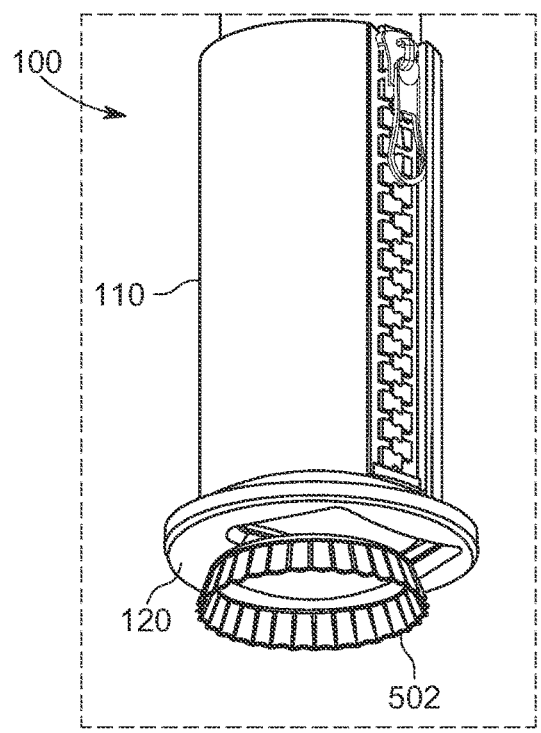
FIG. 7D is an illustration of a next step in a method of using the bottle opener sleeve.

Last, in FIG. 7D, the bottle cap 502 remains attached to the bottle opener sleeve 100. The bottle cap 502 is held in place by the magnetic element 130 preventing the bottle cap from falling to the ground. The bottle cap 502 may be retrieved from the bottle opener sleeve 100 and disposed appropriately.

It is to be understood that variations of the above embodiments may also be represented. One example embodiment may include a bottle opener sleeve that has a sleeve made without a zipper. Another example embodiment may include a bottle opener sleeve that does not include a magnetic element. Yet another example embodiment may include a bottle opener sleeve with an interior surface of a sleeve having a textured surface and the sleeve made without a zipper. These are some of the variations that are possible, however other alternatives are also to be considered within this disclosure.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A bottle opener device, comprising:
   a sleeve having a hollow tubular shape with two opposing ends, an open end and a closed end, wherein the sleeve has a length and a width configured to connect the sleeve to an end of a sporting equipment handle, wherein the sleeve is configured to enclose around the end of the sporting equipment handle; and
   a bottle opener element connected to the closed end of the sleeve, wherein the bottle opener element has a flat and thin shape.

2. The bottle opener device of claim 1, wherein the closed end abuts against the end of the sporting equipment handle and wherein the closed end is relatively thicker than a remainder of the sleeve.

3. The bottle opener device of claim 1, wherein the hollow tubular shape of the sleeve has a cross section selected from the group consisting essentially of a circular cross-section, a square cross-section, a rectangular cross-section, and an oblong cross-section.

4. The bottle opener device of claim 1, wherein the bottle opener element is configured with a hole having a trim and a smaller opening within the hole, wherein the hole is offset from a center axis of the bottle opener element,
- wherein the closed end of the sleeve is integrated with a nipple extending out and away from the closed end and having a recessed portion adjacent to the closed end, wherein the nipple is offset from the center axis of the closed end, and
- wherein the nipple threads through the hole on the bottle opener element and the trim fits around the recessed portion on the nipple.

5. The bottle opener device of claim 4, further comprising a magnetic element fitted within the nipple, wherein the magnetic element is positioned away from the closed end of the sleeve with the recessed portion of the nipple positioned between the magnetic element and the closed end.

6. The bottle opener device of claim 1, wherein the bottle opener element has an opener cutout to fit a bottle cap from a beverage bottle for enabling a bottle cap removal mechanism.

7. The bottle opener device of claim 1, wherein the bottle opener element has a diameter longer than a diameter of the closed end of the sleeve, where the bottle opener element connected to the closed end extends past one or more edges of the closed end of the sleeve.

8. The bottle opener device of claim 1, wherein the bottle opener element and the closed end of the sleeve having equal diameters.

9. The bottle opener device of claim 1, wherein an inner surface of the sleeve has a textured surface.

10. The bottle opener device of claim 1, wherein the bottle opener element is connected to the closed end of the sleeve to pivot away from the closed end during use.

11. A bottle opener device, comprising:
- a sleeve having a hollow tubular shape with an open end and an opposing closed end, wherein the sleeve has a length and a width configured to connect the sleeve to an end of a sporting equipment handle, wherein the sleeve is configured to enclose around the end of the sporting equipment handle;
- a closing mechanism integrated on to the sleeve along the length of the sleeve from the open end to the closed end; and
- a bottle opener element connected to the closed end of the sleeve.

12. The bottle opener device of claim 11, wherein the sleeve has a cutout opening along the length of the sleeve from the open end to the closed end and wherein the closing mechanism is integrated to the sleeve within the cutout opening.

13. The bottle opener device of claim 11, wherein the closed end abuts against the end of the sporting equipment handle and wherein the closed end is relatively thicker than a remainder of the sleeve.

14. The bottle opener device of claim 11, wherein the hollow tubular shape of the sleeve having a cross section selected from the group consisting essentially of a circular cross-section, a square cross-section, a rectangular cross-section, and an oblong cross-section.

15. The bottle opener device of claim 11, wherein the bottle opener element is configured with a hole having a trim and a smaller opening within the hole, wherein the hole is offset from a center axis of the bottle opener element,
- wherein the closed end of the sleeve is integrated with a nipple extending out and away from the closed end and having a recessed portion adjacent to the closed end, wherein the nipple is offset from the center axis of the closed end, and
- wherein the nipple threads through the hole on the bottle opener element and the trim fits around the recessed portion on the nipple.

16. The bottle opener device of claim 15, further comprising a magnetic element fitted within the nipple, wherein the magnetic element is positioned away from the closed end of the sleeve with the recessed portion of the nipple positioned between the magnetic element and the closed end.

17. The bottle opener device of claim 11, wherein the bottle opener element has an opener cutout to fit a bottle cap from a beverage bottle for enabling a bottle cap removal mechanism.

18. The bottle opener device of claim 11, wherein the bottle opener element has a diameter longer than a diameter of the closed end of the sleeve, where the bottle opener element connected to the closed end extends past one or more edges of the closed end of the sleeve.

19. The bottle opener device of claim 11, wherein the bottle opener element and the closed end of the sleeve having equal diameters.

20. The bottle opener device of claim 11, wherein an inner surface of the sleeve has a textured surface.

21. The bottle opener device of claim 11, wherein the bottle opener element is connected to the closed end of the sleeve to pivot away from the closed end during use.

* * * * *